US011507892B1

(12) United States Patent
Henckel et al.

(10) Patent No.: US 11,507,892 B1
(45) Date of Patent: Nov. 22, 2022

(54) DETERMINING A TARGET RECOMMENDATION BASED ON HISTORICAL TRANSACTION DATA

(71) Applicant: INTUIT INC., Mountain View, CA (US)

(72) Inventors: Nathan Henckel, San Diego, CA (US); Tanya Pineo, Surprise, AZ (US); Marla Montevaldo, Tucson, AZ (US); Annie Blaylock, Encinitas, CA (US)

(73) Assignee: INTUIT, INC., Mountain View, CA (US)

( * ) Notice: Subject to any disclaimer, the term of this patent is extended or adjusted under 35 U.S.C. 154(b) by 829 days.

(21) Appl. No.: 16/101,088

(22) Filed: Aug. 10, 2018

(51) Int. Cl.
*G06Q 10/02* (2012.01)
*G06Q 30/06* (2012.01)
*G06Q 50/14* (2012.01)
*G06Q 30/02* (2012.01)

(52) U.S. Cl.
CPC ......... *G06Q 10/02* (2013.01); *G06Q 30/0234* (2013.01); *G06Q 30/0631* (2013.01); *G06Q 50/14* (2013.01)

(58) Field of Classification Search
CPC .... G06Q 10/02; G06Q 50/14; G06Q 30/0631; G06Q 30/0234
See application file for complete search history.

(56) References Cited

U.S. PATENT DOCUMENTS

| | | | | |
|---|---|---|---|---|
| 10,634,508 B2 * | 4/2020 | Valverde, Jr. | ........... | G06Q 10/02 |
| 2008/0167973 A1 * | 7/2008 | De Marcken | ........ | G06Q 10/025 |
| | | | | 705/5 |
| 2010/0121660 A1 * | 5/2010 | Boykin | ................. | G06Q 10/02 |
| | | | | 705/5 |
| 2012/0330906 A1 * | 12/2012 | Fredericks | ............. | G06Q 10/10 |
| | | | | 707/E17.058 |
| 2013/0041902 A1 * | 2/2013 | Swann | .................. | G06F 16/951 |
| | | | | 707/E17.014 |

(Continued)

OTHER PUBLICATIONS

Dennis Schaal, Kayak Homepage Redesign Keeps Pace With its Biggest Rivals, Aug. 23, 2013, Skift (Year: 2013).*

(Continued)

*Primary Examiner* — Resha Desai
*Assistant Examiner* — Ismail A Manejwala
(74) *Attorney, Agent, or Firm* — Patterson & Sheridan, LLP

(57) ABSTRACT

Certain aspects of the present disclosure provide techniques for determining a target recommendation for a transaction based on historical transaction data. An example technique for determining the target recommendation for a transaction based on historical data includes receiving a request for a target recommendation and transaction parameters from a user. Based on the transaction parameters, one or more subsets of historical transaction data are retrieved, and a respective weight applied to generate the target recommendation. Based on which of the one or more retrieved subsets of historical transaction data and respective weight(s) applied generate the target recommendation, a confidence level is generated. A determination is made whether the confidence level meets a minimum confidence level. Based on the determination that the confidence level meets the minimum confidence level, the target recommendation is provided.

20 Claims, 8 Drawing Sheets

(56) References Cited

U.S. PATENT DOCUMENTS

2016/0364712 A1* 12/2016 Mayer ................ G06Q 20/4016
2018/0060432 A1*  3/2018 Kenthapadi ............ G06Q 50/01
2018/0096417 A1*  4/2018 Cook .................... G06F 3/0482

OTHER PUBLICATIONS

Greg Sterling, With help from Alexa, Kayak debuts voice-enabled travel search on Amazon Echo, May 11, 2016, https://searchengineland.com/help-alexa-kayak-debuts-voice-enabled-travel-search-amazon-echo-249287 (Year: 2016).*

* cited by examiner

DETERMINING A TARGET RECOMMENDATION BASED ON HISTORICAL TRANSACTION DATA

INTRODUCTION

Aspects of the present disclosure relate to a method and system for determining a target recommendation. In particular, embodiments of the present disclosure involve determining the target recommendation based on historical transaction data.

BACKGROUND

Travel may be a significant expense for many types of organizations. For example, consulting organizations may have many employees that travel regularly to customer sites. Historically, booking of travel arrangements has been handled by either in-house or third party travel agents. Travel agents traditionally collect information about the desired travel, such as origin, destination, and preferred travel time, for travel by planes, trains, and automobiles, or arrival date and departure date for hotel arrangements, etc. With the travel information, such travel agents then make travel arrangements meeting as best they can with the preferred travel parameters. More recently, third party services, such as travel websites, have provided individuals the ability to quickly research and book travel reservations without the need of travel agents.

There are often many competing travel options available to business travelers. For example, there may be different flights during the day on the same airline, or different airlines offering flights at similar times of the day. As another example, there may be many hotels in a destination city in which to stay. Often, the most "convenient" arrangements are the most expensive. For an organization where travel is part and parcel with the job, it may not be unusual for business travelers to opt for the most convenient travel arrangements without regard to price—especially where the traveler is able to book his or her own arrangements. Even where policies may be in place to help regulate spending on necessary business travel (such as not travelling in first class), the business traveler will often opt for travel arrangements based on convenience and not cost efficiency. Thus, the employee and the organization are not aligned financially despite the employee traveling for the benefit of the organization.

Because convenience is a powerful driver, existing solutions for presenting low cost travel options may not actually compel a business traveler to consider less costly (and likely less convenient) options. Further, because third party travel service providers may aggregate and present averaged data, such as average pricing, based on all travelers, and not just travelers related to a particular organization, any historical or trend-based pricing information is often out of organizational context. Consequently, such average cost data may not provide a compelling basis for comparison for the business traveler, and may thus not affect the business traveler's choices.

Therefore, a solution is needed for determining context-sensitive travel pricing information and presenting it to a would-be traveler in such a way that aligns the interests of the traveler and the organization for whom the traveler is travelling.

BRIEF SUMMARY

Certain embodiments provide a method for determining a target recommendation for a transaction based on historical transaction data. The method generally includes receiving a request from a user for a target recommendation for a transaction. The method further includes receiving transaction parameters, wherein the transaction parameters comprise at least origin data and destination data. The method further includes retrieving one or more subsets of historical transaction data from a data repository based on the transaction parameters. The method further includes generating a target recommendation based on the one or more subsets of historical transaction data, a requirement met of a target recommendation policy, and a respective weight associated with each of the one or more subsets of historical transaction data and the requirement of the target recommendation policy. The method further includes generating a confidence level associated with the target recommendation based on the target recommendation policy. The method further includes determining, based on the target recommendation policy, the confidence level of the target recommendation meets a minimum confidence level. The method further includes based on the determination that the confidence level of the target recommendation meets the minimum confidence level, providing the target recommendation for the transaction.

Other embodiments may provide a non-statutory computer-readable storage medium comprising instructions for a method for determining a target recommendation for a transaction based on historical transaction data. The method generally includes receiving a request from a user for a target recommendation for a transaction. The method further includes receiving transaction parameters, wherein the transaction parameters comprise at least origin data and destination data. The method further includes retrieving one or more subsets of historical transaction data from a data repository based on the transaction parameters. The method further includes generating a target recommendation based on the one or more subsets of historical transaction data, a requirement met of a target recommendation policy, and a respective weight associated with each of the one or more subsets of historical transaction data and the requirement of the target recommendation policy. The method further includes generating a confidence level associated with the target recommendation based on the target recommendation policy. The method further includes determining, based on the target recommendation policy, the confidence level of the target recommendation meets a minimum confidence level. The method further includes based on the determination that the confidence level of the target recommendation meets the minimum confidence level, providing the target recommendation for the transaction.

Other embodiments provide a system comprising a processor and a memory storing instructions which when executed by the processor perform a method for determining a target recommendation for a transaction based on historical transaction data. The method generally includes receiving a request from a user for a target recommendation for a transaction. The method further includes receiving transaction parameters, wherein the transaction parameters comprise at least origin data and destination data. The method further includes retrieving one or more subsets of historical transaction data from a data repository based on the transaction parameters. The method further includes generating a target recommendation based on the one or more subsets of historical transaction data, a requirement met of a target recommendation policy, and a respective weight associated with each of the one or more subsets of historical transaction data and the requirement of the target recommendation policy. The method further includes generating a confidence level associated with the target recommendation based on the target recommendation policy. The method further includes determining, based on the target recommendation policy, the confidence level of the target recommendation meets a minimum confidence level. The method further includes based on the determination that the confidence level of the target recommendation meets the minimum confidence level, providing the target recommendation for the transaction.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
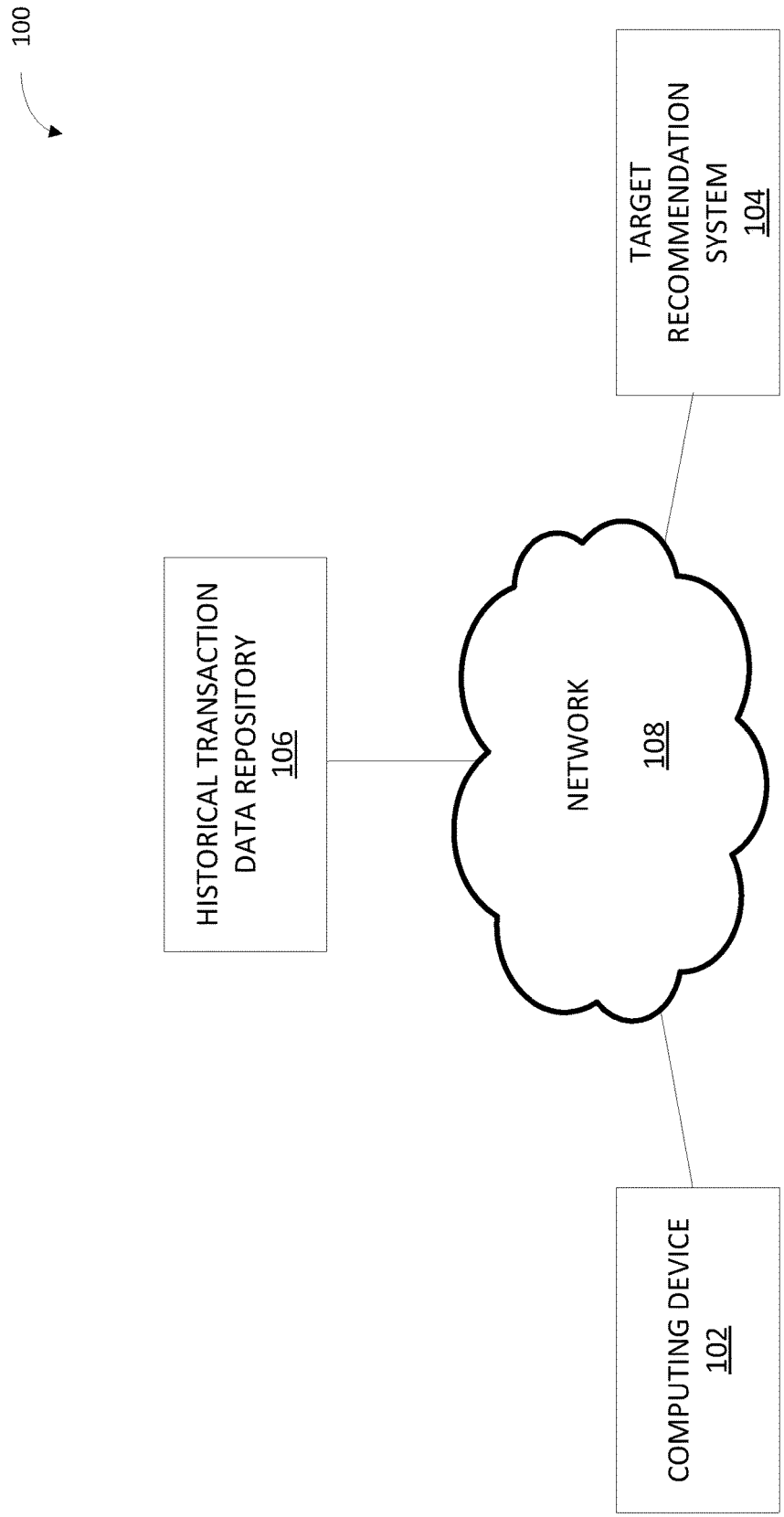
FIG. 1 depicts an example computing environment for determining the target recommendation for a transaction.

Aspects of the present disclosure provide apparatuses, methods, processing systems, and computer readable mediums for determining a target recommendation for a transaction based on historical transaction data.

A target recommendation for a transaction is a recommended value for completing a specific transaction. The target recommendation is used by organizations, in line with one or more policies of the organization, to avoid overspending on transactions, such as for products or services for the operation of the organization. At the same time, the target recommendation is provided to users to encourage transactions at or below the target recommendation.

In some cases, the target recommendation relates to a travel price based on historical travel transaction data that is related to a specific organization. The target recommendation may be presented in such a way as to compel a would-be traveler to select a more cost efficient travel transaction option. For example, the target recommendation may provide a threshold at or below which the traveler will share in the savings with the organization, thereby aligning the traveler and organization financially.

In other cases, the target recommendation relates to a supply inventory price based on historical supply inventory transaction data related to an organization. The target recommendation may be presented in such a way as to compel a would-be purchaser associated with the organization to select a more cost efficient supply inventory transaction option, such as for a transaction completed on behalf of or associated with the organization such as purchasing printer paper, toner, office desks, promotional organization products (i.e., t-shirts, coffee mugs, water bottles, tote bags, magnets, etc.), computers, food and drink items (i.e., coffee, soft drinks, water, candy, etc.), and other products for the operation of the organization. For example, the target recommendation may provide a threshold at or below which the purchaser will earn a reward based on the savings to the organization.

The target recommendation for a transaction is based on a request received from a user via a computing device and transaction parameters received with the request. For example, a user can request a target recommendation for an airline travel transaction and provide origin data (i.e., departure city, departure date, departure time, etc.) and destination data (i.e., destination city, return date, return time, etc.). In another example, a user can request a target recommendation for a transaction of printer paper and provide product data such as the type of product and amount of product.

Based on the request and the transaction parameters received, one or more subsets of historical transaction data are retrieved according to a target recommendation policy of the organization. The target recommendation policy of the organization establishes which subsets of historical transaction data to retrieve, which requirement(s) to meet with regard to transaction parameters, which weights to apply to the retrieved subsets and requirements met, how to distribute a weight for a required subset not retrieved or requirement not met, etc. Furthermore, the target recommendation policy of the organization establishes which transaction parameters are prohibited, including which types of products are prohibited from purchase on behalf of the organization, speed(s) of supply inventory delivery that are prohibited, and which places (i.e., origin data or destination data) are prohibited for travel transactions on behalf of the organization.

Each subset retrieved can comprise historical transaction data with at least a portion of the transaction data the same as the transaction parameters. Furthermore, each subset retrieved is associated with a different time period. In some implementations, the historical transaction data comprises transaction data associated with an organization for which the user is traveling on behalf of. Each subset retrieved can comprise historical transaction data with at least a portion of the origin data and at least a portion of the destination data the same as the transaction parameters (i.e., the transactions retrieved can have the same departure city and the same destination city). Furthermore, a first subset of historical transaction data can comprise historical transaction data with the same departure city and the same destination city as the transaction parameters that occurred in the year 2017 (Jan. 1, 2017 to Dec. 31, 2017). A second subset of historical transaction data can comprise historical transaction data with the same departure city and the same destination city as the transaction parameters that occurred in the first three months of the year 2018 (i.e., Q1 of Jan. 1, 2018, to Mar. 31, 2018).

In other implementations, the historical transaction data comprises transaction data associated with an organization for which the user is purchasing supply inventory on behalf of. Each subset retrieved can comprise historical transaction data with at least a portion of the product data the same as the transaction parameters (i.e., the transactions retrieved can have the same type of product and the same amount of product). Additionally, a first subset of historical transaction data can comprise historical transaction data with the same type of product and the same amount of product as the transaction parameters that occurred in the year 2017. A second subset of historical transaction data can comprise historical transaction data with the same type of product and the same amount of product as the transaction parameters that occurred in the Q1 of 2018.

In addition to retrieving one or more subsets of historical transaction data, a determination is made whether the transaction parameters received meet target recommendation policy requirement(s). For example, the target recommendation policy for a travel transaction can require the target recommendation be for a transaction a certain number of days in advance of travel, such as 14 days in advance of a transaction. In another example, the target recommendation policy for a supply inventory transaction can require a transaction parameter to be standard delivery and prohibit same day delivery.

Once the one or more subsets of historical transaction data are retrieved and a determination is made whether the transaction parameters meet the target recommendation policy requirement(s), the target recommendation is generated by applying weights. The weights are established by the target recommendation policy and applied to each subset of historical transaction data retrieved and each requirement met of the target recommendation policy. In some implementations, if one of the subsets of historical transaction data is not retrieved (i.e., no transactions in the associated time period with at least the same departure city and destination city as the transaction parameters) or a requirement of the target recommendation policy is not met, the associated weights is re-distributed among the other subsets retrieved or requirements met.

After generating the target recommendation, a confidence level is generated based on the target recommendation policy. The generation of the confidence level considers, according to the target recommendation policy, which subsets of historical transaction data are used to generate the target recommendation (rather than what historical transaction data comprise each subset) and which target recommendation policy requirements are met. For example, a target recommendation policy can require retrieving a subset of historical transaction data for the year 2017, a subset of historical transaction data for Q1 of 2018, and a target recommendation policy requirement is met for determining a target recommendation for a transaction 14 days in advance travel, purchase, etc. If only the subset of historical transaction data for the year 2017 is retrieved to generate the target recommendation, the confidence level may be relatively lower in comparison to the case where both subsets of historical transaction data for the year 2017 and Q1 of 2018 are retrieved to generate the target recommendation. If the target recommendation is generated based on the subset of historical transaction data for the year 2017 and a target recommendation policy requirement is met, then the confidence level can be the same as if only subsets of historical transaction data for the year 2017 and Q1 of 2018 are retrieved and no target recommendation policy requirement is met. Depending on the policy, different combinations of subsets of historical transaction data and target recommendation policy requirements met can result in different confidence levels.

The generated confidence level is then compared to a minimum confidence level, based on the target recommendation policy. If it is determined the generated confidence level does not meet the minimum confidence level, then the target recommendation is not provided. Instead, a target recommendation alert (i.e., a message) can be generated and provided to the user indicating that the target recommendation cannot be provided due to failing to meet target recommendation policy requirement(s), lack of historical transaction data, etc. If it is determined that the generated confidence level meets the minimum confidence level, then the target recommendation for the transaction is provided (i.e., to be displayed to the user requesting the target recommendation). In some implementations, the target recommendation can be provided as part of a target recommendation alert (i.e., message) indicating the target recommendation, reward possibilities for the user, user savings, etc.

With the provided target recommendation, the user can complete a transaction at a third-party system with the target recommendation as reference for completing the transaction at or below the target recommendation. In some implementations, users able to complete transaction at or below the target recommendation for the specific transaction are rewarded. The transaction data associated with the completed transaction by the user can also be added to the historical transaction data repository for future generation of target recommendation.

Additionally, after providing the target recommendation, the user can modify the transaction parameters via an input element. For example, the user can modify the transaction parameters if there was an error, the user is not satisfied with the target recommendation and wants to determine the target recommendation for an alternative transaction, etc. After receiving the modified transaction parameters, a new target recommendation is generated and provided, based on the new confidence level meeting the minimum confidence level of the target recommendation policy. In some implementations, the new target recommendation generated may not be provided because the new confidence level associated with the new target recommendation does not meet the minimum confidence level of the target recommendation policy. Instead, a target recommendation alert (i.e., message) can be generated and provided, indicating that target recommendation does not meet the minimum confidence level of the target recommendation policy.

Advantageously, determining the target recommendation for a transaction based on historical transaction data of an organization (rather than historical transaction data not associated with the organization) allows for target recommendations tailored for users of the organization. This in turn will lead to more cost-effective transaction (i.e., travel, supply inventory, etc.) operations and management to the benefit of the organization.

Furthermore, the user can also benefit from the target recommendation generated based on historical transaction data. In some implementations, by completing a travel transaction at or below the generated target recommendation, the user can receive, according to the target recommendation policy of the organization, at least a portion of the savings. Additionally, the target recommendation can make completing a transaction more convenient to the user. For example, the user may be provided the target recommendation in a separate window, allowing the user to have the target recommendation visible as a reference while completing the transaction at a third-party transaction system (i.e., external website). In another example, the user can be provided with transaction options with the target recommendation, making completion of a transaction at or below the target recommendation more convenient because the user can see all transaction options available. In some implementations, where the organization rewards users for completing a transaction at or below the target recommendation, the user can also see the value amount they can earn, depending on which transaction option is selected.

Additionally, user participation in requesting a target recommendation and completing a transaction at or below the target recommendation results in behavioral changes of the user opting for more cost efficient transactions (i.e., travel transaction, accommodation transactions, supply inventory transactions, etc.). Over time, the change in user behavior for completing more cost efficient transactions results in more savings for the organization as more transactions are completed at lower expense to the organization. In the future of the organization, as users complete transactions at or below the target recommendation and decrease the expenses incurred by the organization, the target recommendation itself can decrease since the target recommendation is generated in part based on the transaction expenses of the organization.

Example Computing Environment for Determining Target Recommendation

FIG. 1 depicts an example computing environment 100 for determining a target recommendation for a transaction. A user can request via a computing device 102 a target recommendation for a transaction from a target recommendation system 104. The computing device 102 can include, for example, a tablet, a smartphone, a laptop computer, a desktop computer, a wearable device, or other computing devices. Target recommendation system 104 can be associated with an organization including an employer, a business, etc. Target recommendation system 104 can also be associated with or otherwise have access to a historical transaction data repository 106. In some examples, the historical transaction data repository 106 is associated with the same organization as target recommendation system 104 and stores all of the transaction data of transactions managed by or completed by users of the organization. In such examples, network 108 may be an internal network to the organization.

Target recommendation system 104 can receive the request from computing device 102 via network 108. Network 108 can include, for example, local area networks (LANs), wireless LANs (WLANs), wide area networks (WANs), wireless WANs (WWANs), and other types of networks capable of transmitting data between computing devices.

Target recommendation system 104 can also receive transaction parameters from a user via computing device 102 and network 108. Upon receiving the request and transaction parameters, target recommendation system 104 can determine a target recommendation for the user to complete a specific transaction based on the transaction parameters received and target recommendation policy. The target recommendation policy includes requirements for determining the target recommendation including number of days in advance of transaction (i.e., for a travel transaction, based on the date of the request for target recommendation and origin data including departure date), minimum confidence level, which subsets of historical transaction data to retrieve, and which weights to apply.

Transaction parameters are data inputs, which are associated with a particular transaction including a travel transaction, a supply inventory transaction, etc., for determining a target recommendation. In some implementations, the transaction parameters for travel transaction can include origin data and destination data for determining a target recommendation, such as for an airline ticket transaction. For example, the origin data can include Los Angeles, Calif., USA (i.e., received as "LAX", "LA", "Los Angeles", etc.) and Jul. 1, 2018 (i.e., received as "Jul. 1, 2018", "07/01/2018", "7/1/18", etc.). Continuing the example, the destination data can include New York City, N.Y., USA (i.e., received as "New York", "NYC", "LGA", "JFK", etc.) and Jul. 8, 2018 (i.e., received as "Jul. 8, 2018", "07/08/2018", "7/8/18", etc.). In some examples, target recommendation system 104 may parse a text or voice-based request using pattern matching, regular expressions, or the like to determine transaction parameters. For example, a user may ask a smart device to "provide a target recommendation for a flight from LAX to San Diego on Friday" and the target recommendation system 104 may parse the received voice data using natural language processing to determine an appropriate search query.

In another example, transaction parameters for travel transactions can include location data and duration data for determining a target recommendation for an accommodation transaction, such as a hotel stay. In yet another example, transaction parameters for travel transactions can include data regarding a rental accommodation, such as a car rental, which may include a pick-up location, drop-off location, time of rental, type or class of car, insurance preference, and other parameters relevant to such an accommodation.

In other implementations, transaction parameters for supply inventory transactions can include product data, such as type of product and amount of product. For example, type of product can include printer paper (i.e., received as "printer paper", "laser printer paper", "inkjet printer paper", "multipurpose paper", "8.5×11 printer paper", "copy and print paper", etc.) and amount of product can include 1 case of printer paper (i.e., received as "1 case", "1 box", "20 lbs", "20 pounds", "10 reams", etc.). In another example, type of product can include coffee mugs (i.e., received as "coffee mugs", "logo coffee mugs", "logo mugs", "company coffee mugs", "blue coffee mugs", etc.) and amount of product can include 200 coffee mugs (i.e., received as "200", "2 hundred", "two hundred", etc.).

Based on the transaction parameters received and the target recommendation policy, target recommendation system 104 can retrieve one or more subsets of historical transaction data from the historical transaction data repository 106. In some implementations, historical transaction data repository 106 can be located remotely from target recommendation system 104. In other implementations, historical transaction data repository 106 can be located at target recommendation system 104. Each subset of historical transaction data comprises all of the transactions based on the transaction parameters and associated with a specific time period. For example, for a target recommendation for a travel transaction from Los Angeles to New York City, each subset of historical transaction data comprises origin data including Los Angeles and destination data including New York City. In another example, for a target recommendation for a supply inventory transaction of printer paper, each subset of historical transaction data comprises type of product including printer paper and amount of product as 10 cases. In some implementations, each subset of historical transaction data can each be stored in a separate database associated with the historical transaction data repository 106. In other implementations, each subset of historical transaction data can be stored in a single database associated with the historical transaction data repository 106.

Furthermore, each subset of historical transaction data is associated with a specific time period. For example, a first subset of historical transaction data includes historical transaction data from the year 2017 (Jan. 1, 2017 to Dec. 31, 2017). A second subset of historical transaction data includes, for example, historical transaction data from the first quarter (Q1) of the year 2018 (i.e., Jan. 1, 2018 to Mar. 31, 2018). A third subset of historical transaction data includes, for example, historical transaction data from the same month, based on the origin and destination data, but from the previous year (i.e., if the origin data includes Jul. 1, 2018, then the retrieved subset of historical transaction data includes historical transaction data from July 2017).

The retrieved subsets are not limited to the subsets of historical transaction data described and can include more or less subsets retrieved based on the target recommendation policy associated with target recommendation system 104. For example, target recommendation policy can include retrieving a subset of historical transaction data including historical transaction data from six months prior to the date of request of target recommendation, from previous fiscal year (i.e., Jul. 1, 2017, to Jun. 30, 2018), lowest historical transaction data from the previous year, etc.

In some implementations, a subset of historical transaction data comprises more than one transaction. In other implementations, a subset of historical transaction data comprises only one transaction. For example, a subset of the lowest historical transaction data from the previous year can comprise a single transaction that was the lowest transaction of the previous year.

The target recommendation is generated by applying weights to each retrieved subset of historical transaction data and value associated with each requirement met of the target recommendation policy. Each applied weight can be a fixed weight or a variable weight, according to the target recommendation policy of the organization. A fixed weight can be applied to subsets of historical transaction data and requirements of the target recommendation policy to ensure consistent consideration of data when generating the target recommendation. A variable weight can be applied to subsets of historical transaction data associated with a most recent period of time and a period of time immediately prior to the most recent period of time. The variable weight applied to the subsets of historical transaction data can be adjust to account for changes and factors effecting transaction prices (i.e., strikes, increase in oil prices, shortage of raw materials, etc.).

In some implementations, the subset of historical transaction data associated with the year 2017 has a weight of 25% applied, whereas the subset of historical transaction data associated with Q1 (Jan. 1, 2018 to Mar. 31, 2018) has a weight of 35% applied. The subset of historical transaction data associated with Q1 of 2018 has a higher weight applied to it in comparison to the subset of historical transaction data associated with the year 2017 because the transactions in the subset of historical transaction data associated with Q1 of 2018 are more recent and reflect more current transactions. Additionally, the weights applied to the subset of historical transaction data associated with the year 2017 and Q1 of 2018 are variable weights according to the target recommendation policy, in order to address fluctuations in the transaction market (i.e., travel transaction market, supply inventory transaction market, etc.).

In other implementations, a target recommendation policy requirement that the target recommendation be for a transaction that is 14 days in advance (i.e., of travel, purchase, etc.) can have an associated weight of 20% applied. The weight applied to the target recommendation policy requirement can be a fixed weight in order to consistently generate a target recommendation that is at or below the transaction market. The subset of historical transaction data including the lowest historical transaction data can have a weight of 10% applied. The weight applied to the subset of historical transaction data including the lowest historical transaction data can be a fixed weight in order to influence the target recommendation to ensure savings over time. The subset of historical transaction data including historical transaction data from the same month of the previous year can have a weight of 10% applied. The weight applied to the subset of historical transaction data from the same month of the previous year can be a fixed weight in order to ensure the target recommendation accounts for seasonal fluctuations and pricing.

Once the target recommendation is generated, a confidence level is generated based on a target recommendation policy. The confidence level is generated based on which of the required subsets of historical transaction data are retrieved and which requirements of the policy are met. Different combinations of subsets retrieved and requirements met yield different confidence levels based on the target recommendation policy.

For example, a target recommendation policy can require retrieving four subsets of historical transaction data, such as from the year 2017, Q1 of 2018, from the same month of the previous year, and the lowest transaction from the previous year, and the number of days in advance of the transaction is at least 14 days. If only subsets of historical transaction data from the year 2017, Q1 of 2018, and from the same month of the previous year are retrieved and the requirement is met that the number of days in advance of the transaction is at least 14 days, then the confidence level generated will be, for example, 80%. If only subsets of historical transaction data from the year 2017, Q1 of 2018, and from the lowest transaction from the previous year is retrieved and the requirement is met that the number of days in advance of the transaction is at least 14 days, then the confidence level generated will be, for example, 75%. If all four subsets are retrieved but the requirement is not met, then the confidence level generated will be, for example, 90%.

After the confidence level is generated, a determination is made whether the generated confidence level meets a minimum confidence level established by the target recommendation policy. Based on the determination, if the generated confidence level does not meet the minimum confidence level, then the target recommendation is not provided to the computing device 102. A target recommendation alert can be generated, such as a message. The message can be provided indicating that a target recommendation cannot be provided to the user. In some implementations, the message can further include details about why the target recommendation is not provided, such as the transaction parameters received violate the target recommendation policy requirement that the number of days in advance of the transaction is not at least 14 days, there is a lack of historical transaction data to generate a target recommendation, etc. If the generated confidence level does meet the minimum confidence level, then the target recommendation is provided. For example, the target recommendation can be provided as part of a target recommendation alert, such as a message indicating the target recommendation, reward possibilities for the user, user savings, etc. In some implementations, according to the target recommendation policy, the generated confidence level is required to meet the minimum confidence level. In other implementations, according to the target recommendation policy, the generated confidence level is required to exceed the minimum confidence level.

After providing the target recommendation, target recommendation system 104 can receive modifications from computing device 102 regarding one or more transaction parameters. Based on the modifications, target recommendation system 104 can generate a new target recommendation and a new confidence level. If the new confidence level meets the minimum confidence level, then the new target recommendation can be provided to the user. In some implementations, the new target recommendation can be provided as part of a target recommendation alert, such as a message indicating the new target recommendation, reward possibilities for the user, user savings, etc. If the new confidence level does not meet the minimum confidence level, then the new target recommendation will not be provided to the user. Instead, a target recommendation alert is generated, and for example, a message can be provided to the user indicating the new target recommendation is not provided due to failing to meet the target recommendation policy, lack of historical transaction data to generate a target recommendation, etc.

Figure 2A:
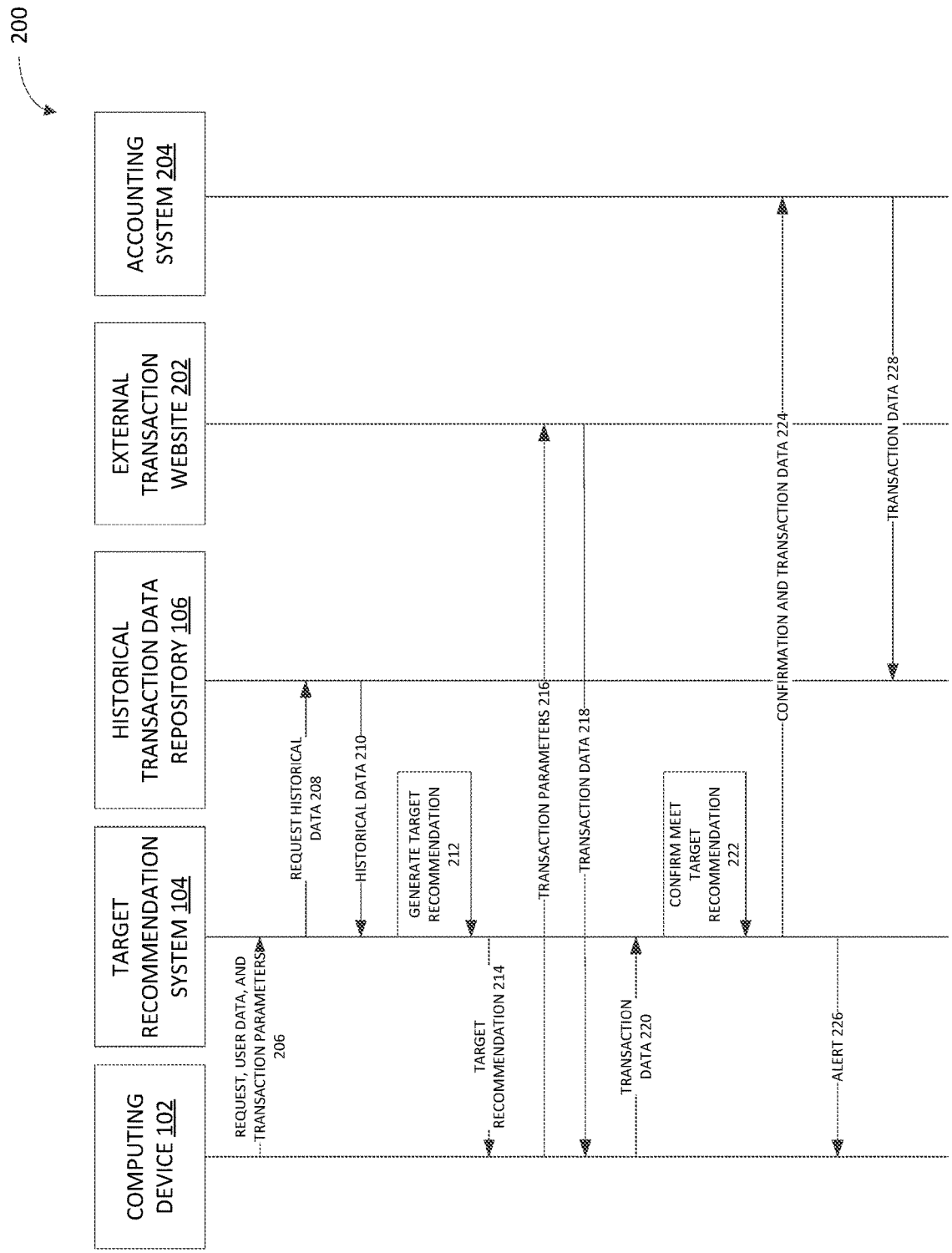
FIG. 2A depicts an example flow diagram for determining the target recommendation and confirming the transaction meets the target recommendation for a transaction.

Example Flow Diagram for Determining Target Recommendation and Confirming Transaction Meets Target Recommendation FIG. 2A depicts an example flow diagram 200 for determining a target recommendation and confirming a transaction meets the target recommendation. In some implementations, the transaction can include, for example, travel transaction, accommodation transaction, rental car transaction, and supply inventory transaction.

In the flow diagram 200, target recommendation system 104 receives a request 206 from a user via a computing device 102 with user data and transaction parameters. The user data can include, for example, user name, login ID, password, etc. to identify a user requesting the target recommendation. The transaction parameters can include origin data and destination data, product type and amount of product, or other data inputs for determining the target recommendation. Based on the request and transaction parameters, the target recommendation system 104 requests historical data 208 and retrieves historical data 210 (i.e., one or more subsets of historical transaction data) from historical transaction data repository 106. Target recommendation system 104 generates a target recommendation 212 based on the retrieved historical data and requirements of the target recommendation policy. In some implementations, the target recommendation policy can be stored as part of target recommendation system 104. In other implementations, the target recommendation policy can be located remotely from target recommendation system 104 but still associated with the same organization of target recommendation system 104. Based on the confidence level generated of the target recommendation meeting the minimum confidence level (not depicted), the target recommendation is then transmitted (i.e., provided) to computing device 102 where it may be displayed to a user.

After the generated target recommendation is provided 214, the user can use a third-party transaction system, such as an external transaction website 202 (e.g., an online travel website, an online office supply website, etc.) to complete a transaction using the same transaction parameters 216 as received by target recommendation system 104 for generating the target recommendation. Once the transaction is complete, external transaction website 202 can provide the user the transaction data 218 (e.g., a travel confirmation, receipt of supply inventory purchase). For example, transaction data 218 for a completed travel transaction can include transaction origin data, transaction destination data, and transaction value data. In another example, transaction data 218 for a completed supply inventory transaction can include transaction product type, transaction amount of product purchased, and transaction value data. In some examples, the transaction data 218 may be provided by way of email, text message, automated phone call, or by other known means.

Target recommendation system 104 may thereafter receive the transaction data 220 from computing device 102 (e.g., after being sent by the user) and confirm the transaction data meets the target recommendation and the associated transaction parameters 222. For example, target recommendation system 104 can determine for a travel transaction whether the transaction origin data matches the origin data of the transaction parameters, the transaction destination data matches destination data of the transaction parameters, and the transaction value data is equal to or less than the target recommendation. In another example, target recommendation system 104 can determine for a supply inventory transaction whether the transaction product type matches the product type of the transaction parameters, the transaction amount of product matches the amount of product of the transaction parameters, and the transaction value data is equal to or less than the target recommendation. If the transaction parameters match the transaction data, and transaction value data of transaction data is equal to or less than the target recommendation, then target recommendation system 104 can send 224 confirmation and transaction data to accounting system 204. Accounting system 204 is associated with the same organization target recommendation system 104 is associated with. For example, target recommendation system 104 and accounting system 204 can be associated with the same employer.

Accounting system 204 can update user and organization accounts based on the confirmation and transaction data. For example, if the transaction meets the target recommendation, the user associated with the transaction can be rewarded with a portion of the cost saved by the organization. Continuing the example, if the transaction does not meet the target recommendation, then the user associated with the transaction, according to the target recommendation policy of the organization, will not be rewarded, but the transaction data (i.e., cost of transaction) can be updated to an account of the organization.

After accounting system 204 updates user or organization accounts, a transaction completion alert (i.e., a message, acknowledgement, etc.) can be generated indicating whether or not the target recommendation is met by the completed transaction. In one example, if the transaction value meets or is less than the target recommendation, a transaction completion alert can be generated for a user indicating that the transaction completed meets or is less than the target recommendation, savings earned by the user based on the transaction completed, etc. In another example, if the transaction value does not meet the target recommendation, a transaction completion alert can be generated for a user indicating that the transaction completed does not meet the target recommendation.

In some implementations, target recommendation system 104 can generate the transaction completion alert and provide the transaction completion alert 226 to the user.

Historical transaction data repository 106 is also updated with the transaction data. In some implementations, the historical transaction data repository 106 may receive transaction data 228 from accounting system 204 (as depicted). In other implementations, the historical transaction data repository 106 may receive transaction data from target recommendation system 104. The transaction data added to the historical transaction data repository can be used to generate future target recommendations.

Figure 2B:
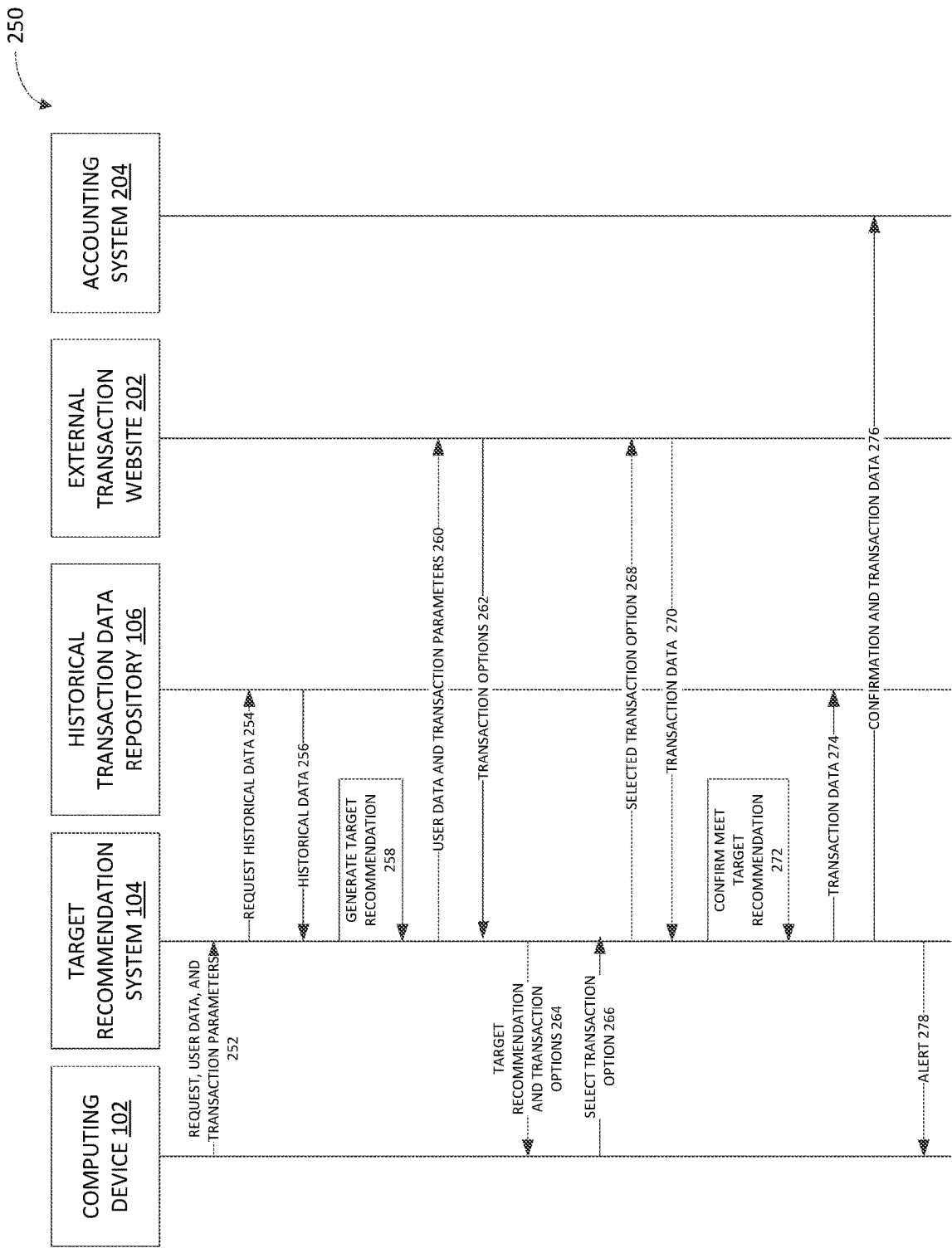
FIG. 2B depicts another example flow diagram for determining the target recommendation and completing a transaction based on the target recommendation for a transaction.

Example Flow Diagram for Determining Target Recommendation and Completing a Transaction FIG. 2B depicts an example flow diagram 250 for determining a target recommendation and completing a transaction. The transaction can include, for example, a travel transaction, an accommodation transaction, a rental transaction, and a supply inventory transaction.

In the flow diagram 250, target recommendation system 104 receives a request 252 from a user via a computing device 102 with user data and transaction parameters. The user data can include, for example, user name, login ID, password, etc. to identify a user requesting the target recommendation. The transaction parameters can include origin data and destination data, product type and amount of product, or other data inputs for determining the target recommendation. Based on the request and transaction parameters, target recommendation system 104 requests historical data 254 and retrieves historical data 256 (i.e., one or more subsets of historical transaction data) from historical transaction data repository 106. Target recommendation system 104 generates a target recommendation 258 based on the retrieved historical data and requirements of the target recommendation policy.

Target recommendation system 104 can provide transaction options for a user via a third-party transaction system, such as an external transaction website 202. Target recommendation system 104 can establish a connection to external transaction website 202 and populate external transaction website 202 with user data and transaction parameters 260 by transmitting the user data and transaction parameters via the connection. The external transaction website 202 can then provide transaction options 262 to target recommendation system 104. Target recommendation system 104 can provide target recommendation (based on the generated confidence level meeting the minimum confidence level) and transaction options 264 to the user via computing device 102. User via computing device 102 can then select a transaction option 266. Target recommendation system 104 can complete the transaction 268, based on the selected transaction option, at the external transaction website 202.

Once the transaction is complete, external transaction website 202 can provide transaction data 270 to target recommendation system 104. In some cases, transaction data includes transaction origin data, transaction destination data, and transaction value data for a completed travel transaction. In other cases, transaction data can include transaction product type, transaction amount of product, and transaction value data for a completed supply inventory transaction.

Target recommendation system 104 can confirm transaction data meets the target recommendation and associated transaction parameters 272. For example, target recommendation system 104 can determine for a travel transaction completed whether the transaction origin data matches the origin data, the transaction destination data matches the destination data, and the transaction value data is equal to or less than the target recommendation. In another example, target recommendation system 104 can determine for a supply inventory transaction completed whether the transaction product type matches the product type data, the transaction amount of product matches the amount of product data, and the transaction value data is equal to or less than the target recommendation. If the transaction parameters and target recommendation match the transaction data, then target recommendation system 104 can send confirmation and transaction data 276 to accounting system 204. Accounting system 204 can update user and organization accounts based on the confirmation and transaction data. For example, if the transaction meets the target recommendation, the user associated with the transaction can be rewarded with a portion of the cost saved by the organization.

In some implementations, if the transaction data does not meet the target recommendation, the accounting system 204 can update the organization's account to reflect the transaction but not the user's account.

After accounting system 204 updates user or organization accounts, a transaction completion alert (i.e., a message, acknowledgement, etc.) can be generated indicating confirmation and whether or not the target recommendation is met by the completed transaction. In some implementations, target recommendation system 104 can generate the transaction completion alert and provide 278 the transaction completion alert to the user.

Historical transaction data repository 106 is also updated with the transaction data. In some implementations, target recommendation system 104 (as depicted) can provide transaction data 274 to historical transaction data repository 106. In other implementations, the historical transaction data repository 106 may receive transaction data from accounting system 204. The added transaction data can be used to generate future target recommendations.

Figure 3A:
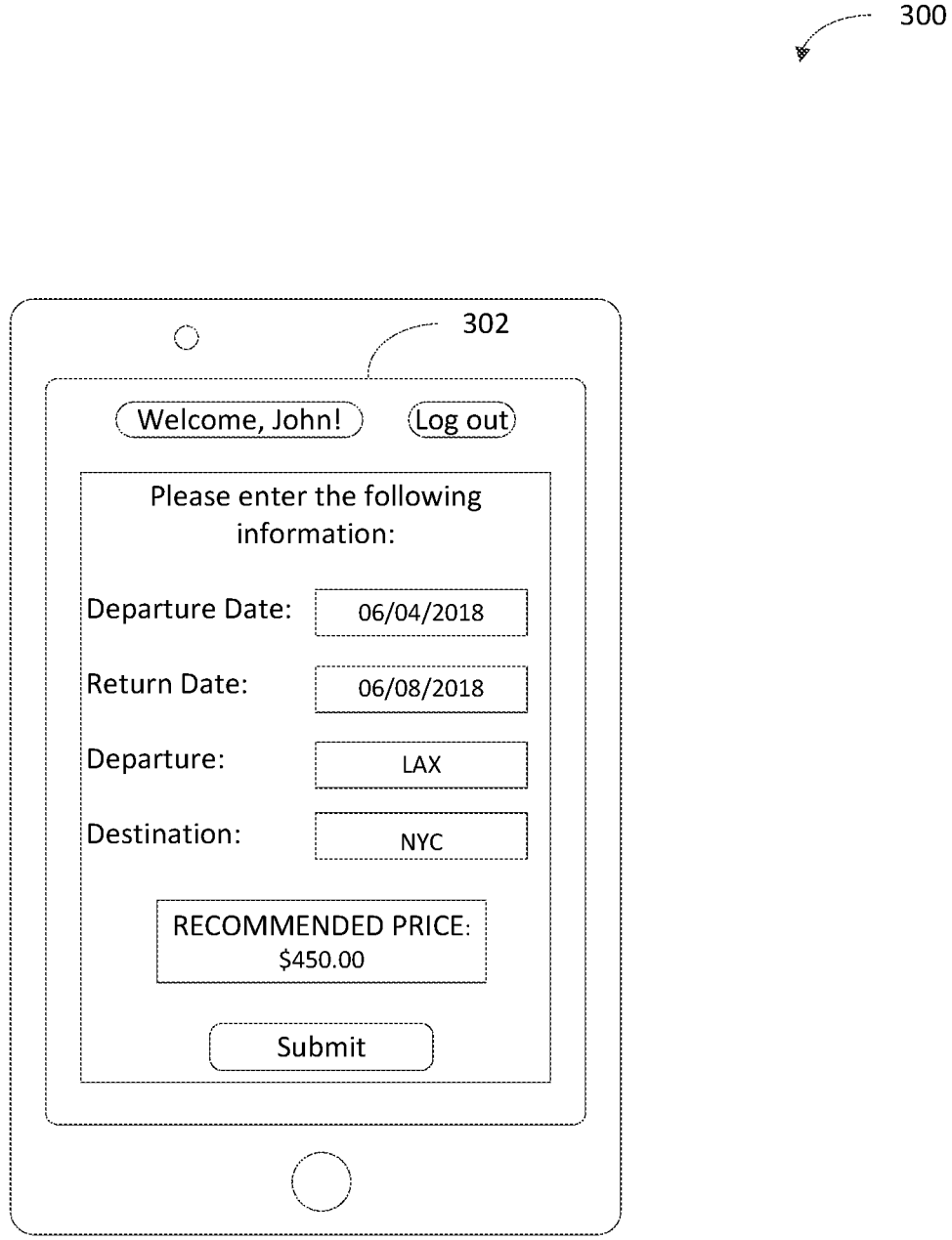
FIG. 3A depicts an example user interface presented to a user for determining the target recommendation for a transaction.

Example User Interface Presented to User for Determining Target Recommendation FIG. 3A depicts an example 300 of user interface 302 presented to a user for determining a target recommendation. In some implementations, a target recommendation system is determining a target recommendation for a travel transaction, such as an airline flight. The user interface 302 presented to the user requires user to provide transaction parameters including origin data (i.e. departure city, departure date, departure time, etc.) and destination data (i.e. destination city, return date, return time, etc.). For example, the user interface 302 (as depicted) can require user to provide departure city (i.e., received as "LAX"), destination city (i.e., received as "NYC"), departure date (i.e., received as "06/04/2018"), and return date (i.e., received as "06/08/2018"). Upon inputting and submitting the transaction parameters, the target recommendation system can receive the request and transaction parameters to generate a target recommendation. Based on the confidence level of the target recommendation meeting the minimum confidence level, the target recommendation can be provided.

In some implementations, the target recommendation can be provided to be displayed within the user interface 302. If there is an error with one of the transaction parameters, the user is not satisfied with the target recommendation, etc., the user can then modify one or more transaction parameters and submit the modified transaction parameters via an input element. The modification of one or more transaction parameters can result in the generation of a new target recommendation, which may be provided to the user if the new confidence level generated of the new target recommendation meets the minimum confidence level.

In other implementations, the target recommendation can be provided in a separate window. The user can then minimize the window and access an external transaction website (i.e. an airline website) to complete a transaction. While completing the transaction at the external transaction website, the user can refer to the target recommendation provided in the separate window.

Figure 3B:
FIG. 3B depicts an example user interface displaying the provided target recommendation and transaction options for a transaction to a user.

Example User Interface Displaying the Provided Target Recommendation and Transaction Options FIG. 3B depicts example 350 of user interface 304 displaying a provided target recommendation and transaction options to a user.

In some implementations, target recommendation system can provide the target recommendation and travel options retrieved from an external transaction website, as described in FIG. 2B, to user interface 304. In the user interface 304, as depicted, the user can determine which travel option to select. With the provided target recommendation displayed, the user can determine from the different options presented, which option is at or below the target recommendation. In some implementations, target recommendation system can also provide users the amount the user can earn as a reward by selecting a certain option, based on the target recommendation policy.

Example Method for Determining the Target Recommendation

Figure 4:
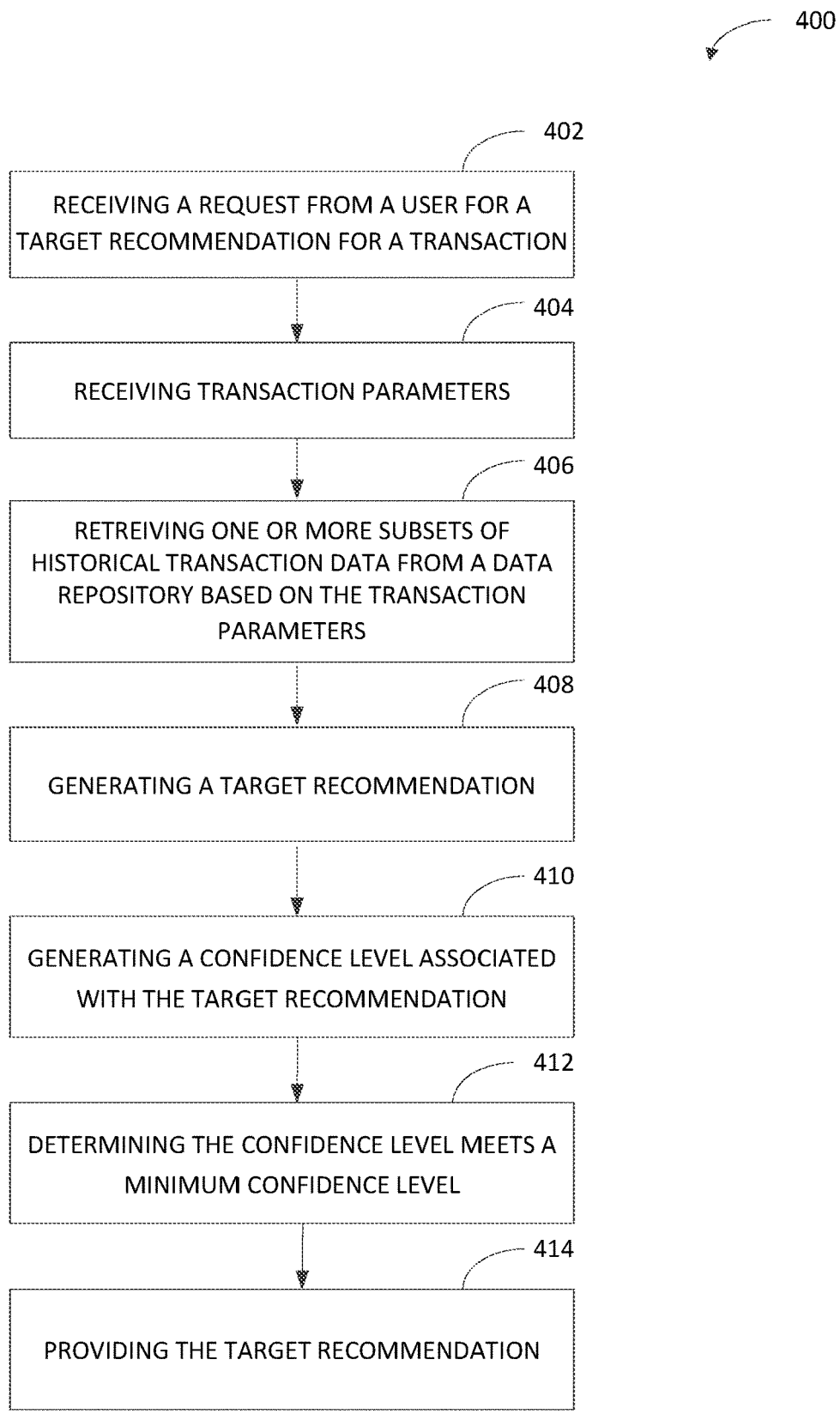
FIG. 4 depicts an example method for determining the target recommendation for a transaction.

FIG. 4 depicts an example method 400 for determining the target recommendation.

At step 402, a request is received from a user for a target recommendation for a transaction. In some implementations, the transaction can include, for example, a travel transaction, an accommodation transaction, a rental transaction, and a supply inventory transaction.

At step 404, transaction parameters are received. The transaction parameters are based on the type of transaction request (i.e., travel transaction, accommodation transaction, car rental transaction, supply inventory transaction, etc.). In some implementations, the transaction parameters comprise origin data (i.e. departure city, departure date, departure time, etc.) and destination data (i.e. destination city, return date, return time, etc.). In other implementations, the transaction parameters comprise location data and duration data. For example, transaction parameters for an accommodation transaction can include location of hotel and number of days and nights at the hotel. In still other implementations, for a supply inventory transaction, the transaction parameters can comprise product data, such as product type, amount of product, type of product delivery, etc.

At step 406, one or more subsets of historical transaction data are retrieved from a historical transaction data repository.

Based on the transaction parameters and a target recommendation policy, one or more subsets of historical transaction data are retrieved from a historical transaction data repository. Each subset retrieved is associated with at least one of the transaction parameters. For example, if the transaction parameters include Los Angeles as part of the origin data and New York City as part of the destination data, then each subset of historical transaction data retrieved comprises all of the transactions that took place during the specific time period associated with each subset where the transaction parameters include Los Angeles as part of the origin data and New York City as part of the destination data. The time period associated with each subset is based on a target recommendation policy. For example, one subset can comprise all of the transactions where origin data includes Los Angeles and destination data includes New York City from the year 2017. Continuing the example, another subset of historical transaction data can comprise all of the transactions where origin data includes Los Angeles and destination data includes New York City from the first quarter (Q1) (i.e., Jan. 1, 2018 to Mar. 31, 2018) of the year 2018.

At step 408, a target recommendation is generated.

To generate the target recommendation, weights may be applied based on the target recommendation policy. In some implementations, the target recommendation policy can require retrieving a plurality of subsets of historical transaction data and require meeting requirement(s) of the target recommendation policy. Each subset in the plurality of subsets of historical transaction data and each requirement of the target recommendation policy is assigned a weight (i.e., a fixed weight or a variable weight) according to the target recommendation policy. The applied weight drives savings associated with the target recommendation. In some implementations, the variable weight can be adjusted based on the target recommendation policy. According to the target recommendation policy, the variable weight can be adjusted based on changes in transaction patterns, real world events, etc. For example, a change in transaction patterns can be the organization increasing the amount of user travel, decreasing the amount of user travel, etc. Corresponding to the change in transaction patterns of the organization, one or more variable weights can be adjusted to take into account the change for determining target recommendation. Continuing the example, real world events such as airlines strikes and oil prices can cause travel prices to increase. This change can be incorporated into the target recommendation determination, for example, by increasing the variable weight for a subset of historical transaction data comprising more recent transactions. In other implementations, the fixed weight can be applied to requirements of the target recommendation policy and can remain constant over a course of time to generate consistent target recommendations at or below transaction market price.

A subset of historical transaction data associated with a more recent time period can have a greater weight applied because the transactions included in the more recent subset reflects more recent transaction price trends. A subset of historical transaction data associated with a time period prior to the more recent time period and further in the past can have a lower weight applied because transactions included in the subset, while reflecting transaction price trends, are not as recent in comparison.

For example, the target recommendation policy can require retrieving a plurality of subsets of historical transaction data, such as from the year 2017, Q1 of 2018, from the same month of the previous year, and the lowest transaction from the previous year. Additionally, the target recommendation policy can require the target recommendation be for a transaction that is 14 days in advance (i.e., of travel). A weight of, for example, 25% can be applied to the average of the retrieved subset of historical transaction data from the year 2017, a weight of, for example, 35% can be applied to the average of the retrieved subset of historical transaction data from Q1 of 2018, a weight of, for example, 10% can be applied to the average of the retrieved subset of historical transaction data from the same month of the previous year, and a weight of, for example, 10% can be applied to the value of the retrieved subset of historical transaction data including the lowest transaction from the previous year. Continuing the example, a weight of 20% can also be applied to the value, as established by the target recommendation policy, of requirement(s) met of the target recommendation policy such as number of days in advance of a transaction.

In some implementations, a target recommendation policy can require one or more subsets of historical transaction data. In some cases, one or more required subsets of historical transaction data cannot be retrieved due to a lack of transaction data meeting transaction parameters associated with the specified time period. For example, the target recommendation policy can require a subset of historical transaction data from the year 2017 to meet the transaction parameters received, but in the case where there was no transaction took place in the year 2017 that meets the transaction parameters received, then that particular subset of historical transaction data cannot be retrieved. In other implementations, the target recommendation policy can require transaction parameters meet requirement(s). In some cases requirement(s) of the target recommendation policy may not be met. For example, the target recommendation policy may require a transaction be 14 days in advance, but based on the transaction parameters and date of request for target recommendation, the transaction may only be 10 days in advance.

In cases where one or more of the subsets of historical transaction data is not retrieved (i.e., no historical transaction data within the specified time period based on the transaction parameters) or a requirement of the target recommendation policy is not met (i.e., not enough days in advance of transaction) then each associated weight is re-distributed based on the target recommendation policy. In some implementations, a weight can be divided proportionately and re-distributed among the retrieved subsets of historical transaction data and requirements met. In other implementations, a weight can be divided equally and re-distributed among the retrieved subsets of historical transaction data and requirements met.

For example, if a target recommendation does not have enough number of days in advance of the transaction, then the 20% weight can be divided proportionately and re-distributed to the 35%, 25%, 10%, and 10% weights applied to the average of the retrieved subset of historical transaction data from Q1 of 2018, the average of the retrieved subset of historical transaction data from the year 2017, the average of the retrieved subset of historical transaction data from the same month of the previous year, and to the value of the retrieved subset of historical transaction data including the lowest transaction from the previous year, respectively. Continuing the example, based on the re-distribution, a weight of 44% can be applied to the average of the retrieved subset of historical transaction data from Q1 of 2018, 31% be applied to the average of the retrieved subset of historical transaction data from the year 2017, 12.5% can be applied to the retrieved average of the subset of historical transaction data from the same month of the previous year, and 12.5% can be applied to the value of the retrieved subset of historical transaction data including the lowest transaction from the previous year.

In another example, if target recommendation does not have enough number of days in advance of the transaction, then the 20% weight can be divided equally and re-distributed to the 35%, 25%, 10%, and 10% weights applied to the average of the retrieved subset of historical transaction data from Q1 of 2018, the average of the retrieved subset of historical transaction data from the year 2017, the average of the retrieved subset of historical transaction data from the same month of the previous year, and to the value of the retrieved subset of historical transaction data including the lowest transaction from the previous year, respectively. Continuing the example, a weight of 40% can be applied to the average of the retrieved subset of historical transaction data from Q1 of 2018, 30% be applied to the average of the retrieved subset of historical transaction data from the year 2017, 15% can be applied to the average of the retrieved subset of historical transaction data from the same month of the previous year, and 15% can be applied to the value of the retrieved subset of historical transaction data including the lowest transaction from the previous year.

At step 410, a confidence level is generated. The confidence level is generated based on which of the required subsets of historical transaction data are retrieved and which requirements of the target recommendation policy are met. Different combinations of retrieved subsets of historical transaction data and requirements met result in different confidence levels, according to the target recommendation policy. Confidence levels generated are greater when at least a subset of historical transaction data associated with a more recent time period, a subset of historical transaction data associated with a time period prior to the more recent time period, or both are retrieved. In comparison, if neither the subset of historical transaction data associated with a more recent time period nor the subset of historical transaction data associated with a time period prior to the more recent time period are retrieved, the confidence level generated is less. If only one of either the subset of historical transaction data associated with a more recent time period or the subset of historical transaction data associated with a time period prior to the more recent time period is retrieved, the confidence level generated is less than if both are retrieved but greater than if neither subset is retrieved.

In one example, a target recommendation policy can require three specific subsets of historical transaction data and one target recommendation policy requirement for determining the target recommendation. If all three specific subsets of historical transaction data are retrieved and the requirement of the target recommendation policy is met, then the confidence level will be 100%.

In another example, a target recommendation policy can require four specific subsets of historical transaction data (i.e. such as a subset from the year 2017, a subset from Q1 of 2018, a subset from the same month of the previous year, and a subset of the lowest transaction from the previous year) and a target recommendation policy requirement (i.e., 14 days in advance of the transaction). If only three of the four specific subsets of historical transaction data are retrieved (i.e., a subset from the year 2017, a subset from Q1 of 2018, a subset from the same month of the previous year) and the requirement of the target recommendation policy is met, then the confidence level will be 85%, according to the target recommendation policy. If a different subset of three is retrieved (i.e., a subset from the year 2017, a subset from the same month of the previous year, and a subset of the lowest transaction from the previous year) and the requirement of the target recommendation policy is met, then the confidence level will be 80%, according to the target recommendation policy. If only the subset from the same month of the previous year, the subset of the lowest transaction from the previous year, and the requirement of the target recommendation policy is met, then the confidence level will be 60%, according to the target recommendation policy.

In some implementations, the generation of confidence level for the same transaction can be different at a first time requesting target recommendation and at a second time requesting target recommendation, depending on the target recommendation policy. For example, at a first time, if all of the required subsets of historical transaction data are retrieved and all requirements of the target recommendation policy are met, the confidence level is 100%. However, at a second time subsequent to the first time, if all of the required subsets of historical transaction data are retrieved, but requirement(s) of the target recommendation policy are no longer met, then confidence level can be generated as 80%.

At step 412, a determination is made whether the confidence level generated meets a minimum confidence level. The minimum confidence level may be established by the target recommendation policy. In some cases, the confidence level generated can be compared to the minimum confidence level. For example, the minimum confidence level established by the target recommendation policy can be 80%. If the confidence level generated is 75%, then the confidence level generated does not meet the minimum confidence level (i.e., the generated confidence level fails). Based on this determination, the target recommendation is not provided. In some implementations, a target recommendation alert such as a message can be generated and provided to the user indicating that the target recommendation cannot be provided because of failing to meet the target recommendation policy.

If the confidence level does meet the minimum confidence level (i.e., the generated confidence level passes), then the method continues to step 414 with providing the target recommendation for the transaction. In some implementations, the target recommendation is provided in the same user interface as where the transaction parameters are received from. In other implementations, the target recommendation is provided in a separate window. In still other implementations, a target recommendation alert can be generated, such as a message, and the target recommendation can be provided as part of the target recommendation alert. The message can also include, based on the target recommendation policy, the value amount a user can earn by completing a transaction at or below the target recommendation. For example, the value amount can be a single value or the value amount can be a range of values that the user can earn depending on how much below the target recommendation the transaction is completed.

In some cases, a modification can be received via an input element. The input element can allow the user to modify one or more transaction parameters. For example, if the wrong transaction parameters are received, then the input element allows the user to correct and modify the transaction parameters, as described in FIGS. 1 and 3A.

In some implementations, a new target recommendation can be provided based on receiving a modification of at least one transaction parameter via an input element. A new confidence level is also generated with the new target recommendation. If the new confidence level meets the minimum confidence level, then the new target recommendation is provided. If the new confidence level does not meet the minimum confidence level, then the new target recommendation is not provided. In some cases, a message can be generated and provided to the user that the new target recommendation cannot be provided because of failing to meet the target recommendation policy, lack of historical transaction data, etc.

Example Server for Determining the Target Recommendation

Figure 5A:
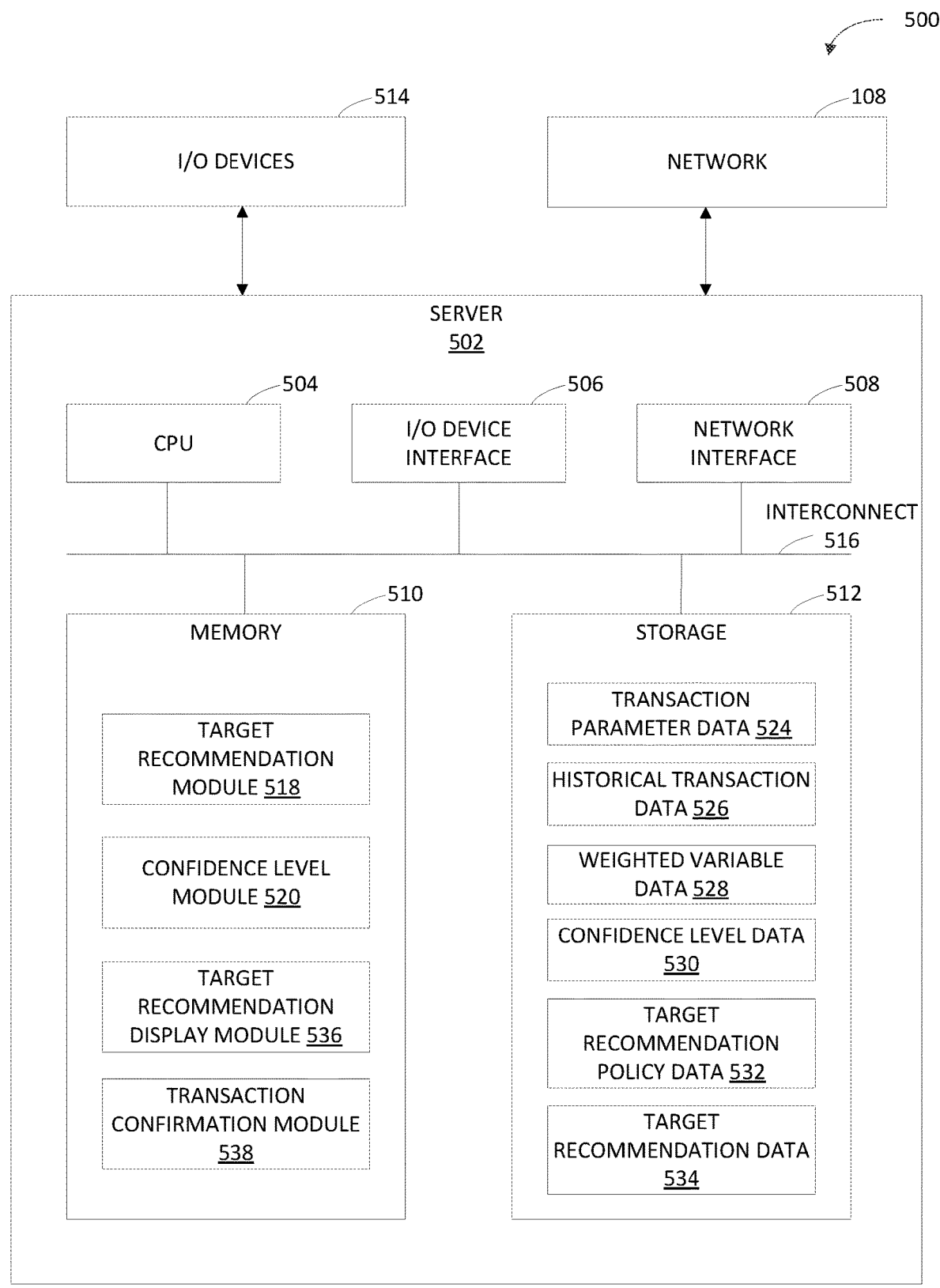
FIG. 5A depicts an example server for determining the target recommendation for a transaction.

FIG. 5A depicts an example server 500 of a target recommendation system for determining the target recommendation. For example, the example server 500 can be representative of a server 502 associated with target recommendation system 104, as depicted and described with respect to FIG. 1.

As shown, the server 502 includes a central processing unit (CPU) 504, one or more input/output (I/O) device interfaces 506 that can allow for the connection of various I/O devices 514 (e.g., keyboards, displays, mouse devices, pen input, etc.) to the server 502, network interface 508, a memory 510, a storage 512, and an interconnect 516. It is contemplated that one or more components of the example server 500 can be located remotely and accessed via network 108. It is further contemplated that one or more components of the example server 500 can comprise physical components or virtualized components.

CPU 504 may retrieve and execute programming instructions stored in the memory 510. The memory 510 can include a target recommendation module 518, a confidence level module 520, a target recommendation display module 536, and a transaction confirmation module 538. For example, CPU 504 can be configured to execute instructions and perform the method described above with respect to FIGS. 2A, 2B, and 4.

The target recommendation module 518 can generate a target recommendation for a transaction based on transaction parameters, applied weights, historical transaction data 526, and a target recommendation policy. The target recommendation module 518 can retrieve the transaction parameters received with the request from the transaction parameter data 524 in storage 512. In some implementations, the request and transaction parameters may be received via network 108 from a computing device associated with a user. Based on the transaction parameters, the target recommendation module 518 can retrieve one or more subsets of historical transaction data from historical transaction data 526. The target recommendation module 518 can then apply the weights (retrieved from the weight data 528) to the one or more subsets of historical transaction data and requirements met based on the target recommendation policy, which can be retrieved from the target recommendation policy data 532.

Target recommendation policy data 532 can include policies that affect how the target recommendation is generated including policies requiring or prohibiting certain types of transactions. The policy can take into account different factors for purposes of determining target recommendation. For example, target recommendation policy data 532 associated with generating a target recommendation for a travel transaction can include data prohibiting travel transaction purchases with certain origin data or destination data that are not associated with the travel transactions on behalf of the organization, establishing a maximum amount for a transaction, requiring date of transaction be at least 14 days in advance, and so forth. For example, if an organization routinely has users traveling on their behalf between San Diego, Calif., USA, and Seattle, Wash., USA, then target recommendation policy can allow determining target recommendations where the origin data and the destination data includes San Diego, Calif., USA, or Seattle, Wash., USA. Continuing the example, based on the organization's routine travel, the organization can establish as part of the target recommendation policy data 532 a policy prohibiting travel transactions where either the origin data or destination data is Juneau, Ak., USA, because it is not part of the organization's routine course of travel. As another example, target recommendation policy data 532 can include a policy prohibiting purchase of a travel transaction less than 14 days in advance from San Diego, Calif., USA to Seattle, Wash., USA.

Upon applying the weights, the target recommendation module 518 can generate a target recommendation. The target recommendation can be stored in storage 512 as target recommendation data 534.

The confidence level module 520 can generate a confidence level for a generated target recommendation based on a target recommendation policy, stored as target recommendation policy data 532. Upon retrieving the target recommendation policy, the confidence level can be generated based on which subsets of historical transaction data are actually retrieved and which target recommendation policy requirements are met for the generated target recommendation. The generated confidence level can be stored as confidence level data 530 in storage 512.

The target recommendation display module 536 can determine whether to provide the generated target recommendation stored in target recommendation data 534. The target recommendation display module 536 can retrieve the generated confidence level from confidence level data 530 and the minimum confidence level from the target recommendation policy data 532. In some implementations, the minimum confidence level can also be stored as confidence level data 530. After retrieving the generated confidence level and the minimum confidence level from storage 512, a determination is made whether the generated confidence level meets the minimum confidence level. If the generated confidence level does not meet the minimum confidence level, then the target recommendation is not provided. A target recommendation alert can be generated such as a message, and the message can be provided indicating that the target recommendation cannot be provided and the reasoning (i.e., failing to meet target recommendation policy requirements, lack of historical transaction data, etc.). If the generated confidence level meets the minimum confidence level, then the target recommendation is provided (i.e., to be displayed to the user requesting the target recommendation). In some implementations, the target recommendation can be provided as part of a target recommendation alert. In some implementations, the target recommendation or the target recommendation alert can be provided via network 108 to the computing device that requested the target recommendation.

The transaction confirmation module 538 can determine whether a completed transaction meets the target recommendation. The transaction confirmation module 538 can receive transaction data from a completed transaction via network 108. In some implementations, transaction data from a completed transaction can be received from a computing device. In other implementations, transaction data from a completed transaction can be received from a third-party transaction system, such as an external transaction system (i.e., website). The transaction confirmation module 538 can determine whether the transaction data matches the transaction parameters and target recommendation. For example, transaction confirmation module 538 can determine for a travel transaction module whether the transaction origin data matches the origin data (i.e., stored as transaction parameter data 524), the transaction destination data matches the destination data (i.e., stored as transaction parameter data 524), and the transaction value data is equal to or less than the target recommendation (i.e., stored as target recommendation data 534). In another example, transaction confirmation module 538 can determine for a supply inventory transaction whether transaction product type matches product type (i.e., stored as transaction parameter data 524), transaction amount of product matches amount of product (i.e., stored as transaction parameter data 524), transaction type of delivery matches product delivery (i.e., stored as transaction parameter data 524), etc., and the transaction value data is equal to or less than the target recommendation. Based on the determination, a transaction completion alert can be generated indicating whether or not the target recommendation is met. The transaction completion alert can be provided to a computing device via network 108. In some implementations, the received transaction data can be stored in storage 512 as part of historical transaction data 526. In other implementations, the received transaction data can be provided to via network 108 and stored in a historical transaction data repository.

The interconnect 516 transmits programming instructions, transaction parameter data 524, historical transaction data 526, target recommendation data 534, and other data among the CPU 504, I/O device interface 506, network interface 508, memory 510, and storage 512. CPU 504 is included to be representative of a single CPU, multiple CPUs, and a single CPU having multiple processing cores. Additionally, the memory 510 is included to be representative of a random access memory. Furthermore, the storage 512 can be a disk drive, solid state drive, or a collection of storage devices distributed across multiple storage systems. Although shown as a single unit, the storage 512 can be a combination of fixed and/or removable storage devices, such as fixed disc drives, removable memory cards or optical storage, network attached storage (NAS), or a storage area-network (SAN). Storage 512 may comprise transaction parameter data 524, historical transaction data 526, weight data 528, confidence level data 530, target recommendation policy data 532, and target recommendation data 534.

Example Computing Device for Determining the Target Recommendation

Figure 5B:
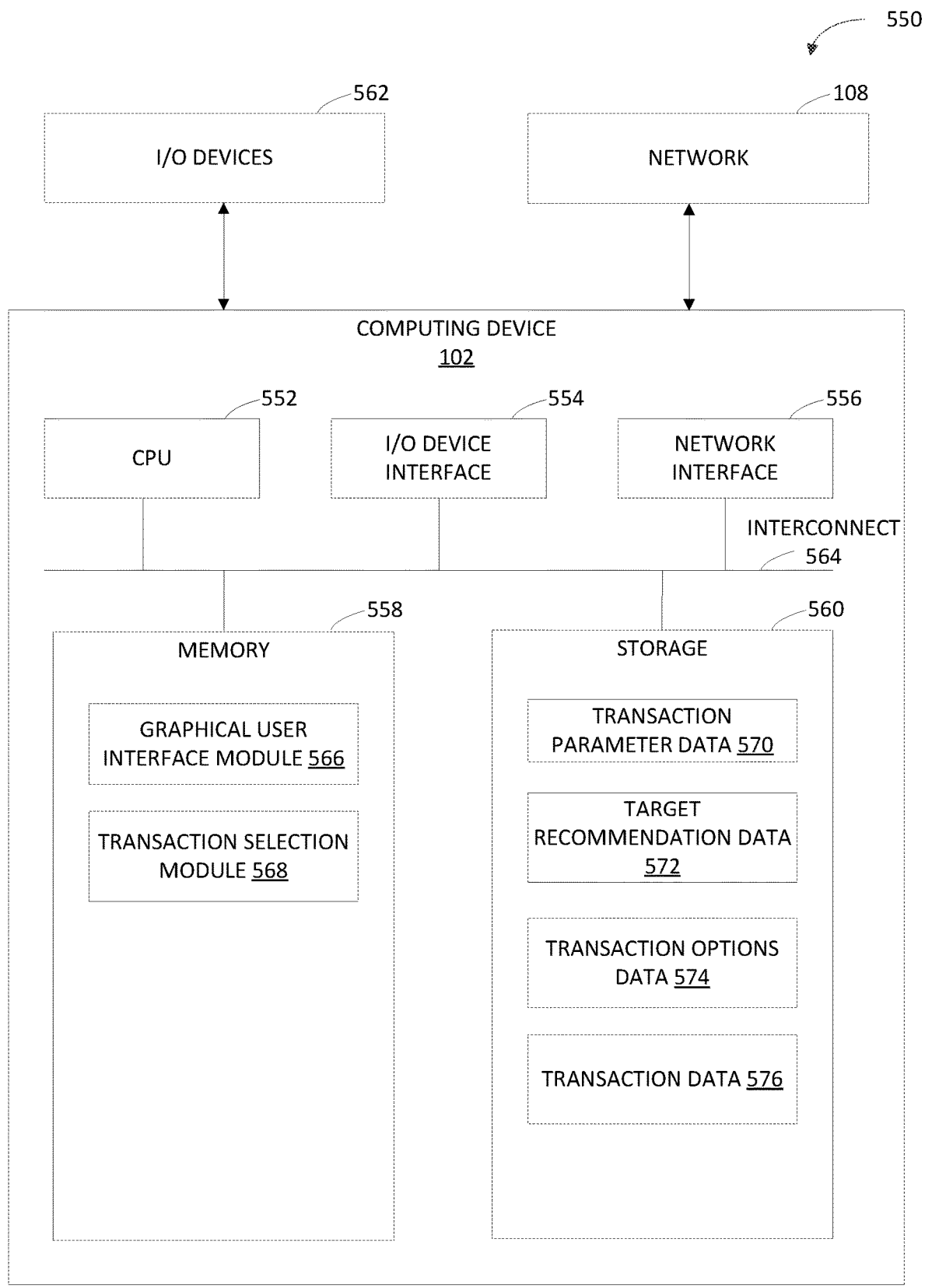
FIG. 5B depicts an example computing device for determining the target recommendation for a transaction.

FIG. 5B depicts an example computing device 550 for determining the target recommendation. For example, the computing device 550 can be representative of a computing device 102 associated with a user requesting a target recommendation from target recommendation system 104, as depicted and described with respect to FIG. 1.

As shown, the computing device 102 includes a central processing unit (CPU) 552, one or more input/output (I/O) device interfaces 554 that can allow for the connection of various I/O devices 562 (e.g., keyboards, displays, mouse devices, pen input, etc.) to the computing device 102, network interface 556, a memory 558, a storage 560, and an interconnect 564. It is contemplated that one or more components of the computing device 550 can be located remotely and accessed via network 108. It is further contemplated that one or more components of the computing device 550 can comprise physical components or virtualized components.

CPU 552 may retrieve and execute programming instructions stored in the memory 558. The memory 558 can include a graphical user interface module 566 and transaction selection module 568.

The graphical user interface module 566 can provide a graphical user interface for determining the target recommendation. The graphical user interface module 566 can present an interface to receive from a user transaction parameter inputs. The transaction parameter inputs can be stored in storage 560 as transaction parameter data 570. The graphical user interface module 566 can also present an interface to display a target recommendation based on whether the confidence level of the target recommendation meets a minimum confidence level. The target recommendation can be provided by a target recommendation system and stored in storage 560 as target recommendation data 572. The graphical user interface module 566 can also provide an input element to allow users to modify at least one of the transaction parameters. The modified transaction parameters can be stored as transaction parameter data 570.

The transaction selection module 568 can determine a selection of a transaction from transaction options (i.e., travel options). For example, transaction options from external transaction systems (i.e., websites) can be retrieved by target recommendation system. Computing device 102 can receive travel options from target recommendation system and can store transaction options as transaction options data 574. Transaction selection module 568 can display the transaction options via graphical user interface module 566. The user can select a transaction option, and the transaction selection module 568 can receive the selected option via graphical user interface module 566. The selected transaction option can be stored as transaction options data 574. The selected transaction option can be received by target recommendation system to complete transaction. The transaction data from the completed transaction can be provided to and displayed on the computing device 102. The transaction data from the completed transaction can be stored as transaction data 576. In some implementations, the graphical user interface module 566 can include transaction selection module 568. In other implementations, the transaction selection module 568 can be separate from graphical user interface module 566.

The interconnect 564 transmits programming instructions, transaction parameter data 570, transaction data 576, and other data among the CPU 552, I/O device interface 554, network interface 556, memory 558, and storage 560. CPU 552 is included to be representative of a single CPU, multiple CPUs, and a single CPU having multiple processing cores. Additionally, the memory 558 is included to be representative of a random access memory. Furthermore, the storage 560 can be a disk drive, solid state drive, or a collection of storage devices distributed across multiple storage systems. Although shown as a single unit, the storage 560 can be a combination of fixed and/or removable storage devices, such as fixed disc drives, removable memory cards or optical storage, network attached storage (NAS), or a storage area-network (SAN). Storage 560 may comprise transaction parameter data 570, target recommendation data 572, transaction options data 574, and transaction data 576.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, being performed by one or more processors, for determining a target recommendation for a transaction based on historical transaction data, comprising:
    receiving voice data from a user comprising a request for a target recommendation for a transaction;
    parsing the voice data using natural language processing to determine transaction parameters associated with the transaction, wherein the transaction parameters comprise at least:
    origin data; and
    destination data;
    retrieving one or more subsets of historical transaction data from a data repository based on the transaction parameters and one or more requirements of a target recommendation policy, wherein each subset has one or more historical transactions associated with at least one of the transaction parameters;
    generating the target recommendation based on the one or more subsets of historical transaction data, one or more met requirements, and a respective weight associated with each of the one or more subsets of historical transaction data and the one or more met requirements of the target recommendation policy;
    generating a confidence level for the target recommendation based on the one or more subsets of historical transaction data, the one or more met requirements, and the one or more requirements;
    determining the confidence level of the target recommendation meets a minimum confidence level;
    based on the determination that the confidence level of the target recommendation meets the minimum confidence level, providing the target recommendation for the transaction in a separate display window from a display window corresponding to a third-party transaction system associated with the transaction, wherein the separate display window is configured to allow the user to reference the target recommendation while accessing the third-party transaction system;
    confirming that a corresponding transaction completed by the user at the third-party transaction system meets or is below the target recommendation; and
    updating the data repository based on the corresponding transaction meeting or being below the target recommendation; and
    generating, based on the updated data repository, an additional target recommendation.

2. The method of claim 1, wherein the method further comprises:
    establishing a connection to the third-party transaction system;

transmitting the transaction parameters of the target recommendation to the third-party transaction system; and receiving one or more transaction options from the third-party transaction system based on the transaction parameters.

3. The method of claim 1, wherein the confirming is based on:

receiving data associated with the transaction completed by the user, wherein the data comprises:
transaction origin data;
transaction destination data; and
transaction value data; and determining, based on the received data, that:
the transaction origin data matches the origin data;
the transaction destination data matches the destination data; and
the transaction value data is equal to or less than the target recommendation; and generating a transaction completion alert.

4. The method of claim 1, wherein each weight is based on the target recommendation policy.

5. The method of claim 4, further comprising redistributing each respective weight associated with the one or more subsets of historical transaction data based on a number of retrieved subsets of historical transaction data.

6. The method of claim 1, wherein the method further comprises: receiving a modification via an input element configured to allow the user to modify at least one of the transaction parameters.

7. The method of claim 1, wherein one of the one or more requirements of the target recommendation policy comprises retrieving a minimum amount of subsets of historical transaction data from the data repository.

8. A non-transitory computer-readable storage medium storing instructions that when executed by a processor causes an electronic device to:

receive voice data from a user comprising a request for a target recommendation for a transaction;

parse the voice data using natural language processing to determine transaction parameters associated with the transaction, wherein the transaction parameters comprise at least:
origin data; and
destination data;

retrieve one or more subsets of historical transaction data from a data repository based on the transaction parameters and one or more requirements of a target recommendation policy, wherein each subset has one or more historical transactions associated with at least one of the transaction parameters;

generate the target recommendation based on the one or more subsets of historical transaction data, one or more met requirements, and a respective weight associated with each of the one or more subsets of historical transaction data and the one or more met requirements of the target recommendation policy;

generate a confidence level for the target recommendation based on the one or more subsets of historical transaction data, the one or more met requirements, and the one or more requirements;

make a determination that the confidence level of the target recommendation meets a minimum confidence level; and based on the determination that the confidence level of the target recommendation meets the minimum confidence level, providing the target recommendation for the transaction in a separate display window from a display window corresponding to a third-party transaction system associated with the transaction, wherein the separate display window is configured to allow the user to reference the target recommendation while accessing the third-party transaction system;

confirm that a corresponding transaction completed by the user at the third-party transaction system meets or is below the target recommendation; and update the data repository based on the corresponding transaction meeting or being below the target recommendation; and generate, based on the updated data repository, an additional target recommendation.

9. The non-transitory computer-readable storage medium of claim 8, wherein, when the instructions are executed, the processor further causes the electronic device to:

establish a connection to the third-party transaction system;

transmit the transaction parameters of the target recommendation to the third-party transaction system; and receive one or more transaction options from the third-party transaction system based on the transaction parameters.

10. The non-transitory computer-readable storage medium of claim 8, wherein the processor causing the electronic device to confirm comprises the processor causing the electronic device to:

receive data associated with the transaction completed by the user, wherein the data comprises:
transaction origin data;
transaction destination data; and
transaction value data; and determine, based on the received data, that:
the transaction origin data matches the origin data;
the transaction destination data matches the destination data; and
the transaction value data is equal to or less than the target recommendation; and generate a transaction completion alert.

11. The non-transitory computer-readable storage medium of claim 8, wherein each weight is based on the target recommendation policy.

12. The non-transitory computer-readable storage medium of claim 11, wherein, when the instructions are executed, the processor further causes the electronic device to redistribute each respective weight associated with the one or more subsets of historical transaction data based on a number of retrieved subsets of historical transaction data.

13. The non-transitory computer-readable storage medium of claim 8, wherein, when the instructions are executed, the processor further causes the electronic device to receive a modification via an input element configured to allow the user to modify at least one of the transaction parameters.

14. The non-transitory computer-readable storage medium of claim 8, wherein one of the one or more requirements of the target recommendation policy comprises a requirement that the electronic device retrieved a minimum amount of subsets of historical transaction data from the data repository.

15. A system, comprising:
a memory comprising executable instructions; and
a processor configured to execute the executable instructions and cause the system to:
receive voice data from a user comprising a request for a target recommendation for a transaction;

parse the voice data using natural language processing to determine transaction parameters associated with the transaction, wherein the transaction parameters comprise at least:
   origin data; and
   destination data;
retrieve one or more subsets of historical transaction data from a data repository based on the transaction parameters and one or more requirements of a target recommendation policy, wherein each subset has one or more historical transactions associated with at least one of the transaction parameters;
generate the target recommendation based on the one or more subsets of historical transaction data, one or more met requirements, and a respective weight associated with each of the one or more subsets of historical transaction data and the one or more met requirements of the target recommendation policy;
generate a confidence level for the target recommendation based on the one or more subsets of historical transaction data, the one or more met requirements, and the one or more requirements;
determine the confidence level of the target recommendation meets a minimum confidence level; and
based on the determination that the confidence level of the target recommendation meets the minimum confidence level, provide the target recommendation for the transaction in a separate display window from a display window corresponding to a third-party transaction system associated with the transaction, wherein the separate display window is configured to allow the user to reference the target recommendation while accessing the third-party transaction system;
confirm that a corresponding transaction completed by the user at the third-party transaction system meets or is below the target recommendation; and
update the data repository based on the corresponding transaction meeting or being below the target recommendation; and
generate, based on the updated data repository, an additional target recommendation.

16. The system of claim 15, wherein the processor is further configured to cause the system to:
   establish a connection to the third-party transaction system;
   transmit the transaction parameters of the target recommendation to the third-party transaction system; and
   receive one or more transaction options from the third-party transaction system based on the transaction parameters.

17. The system of claim 15, wherein the processor being configured to confirm the user completed the transaction comprises the processor being configured to:
   receive data associated with the transaction completed by the user, wherein the data comprises:
      transaction origin data;
      transaction destination data; and
      transaction value data; and
   determine, based on the received data, that:
      the transaction origin data matches the origin data;
      the transaction destination data matches the destination data; and
      the transaction value data is equal to or less than the target recommendation; and
   generate a transaction completion alert.

18. The system of claim 15, wherein each weight is based on the target recommendation policy.

19. The system of claim 15, wherein one of the one or more requirements of the target recommendation policy comprises a requirement that the system retrieved a minimum amount of subsets of historical transaction data from the data repository.

20. The system of claim 15, wherein the processor is further configured to cause the system to redistribute each respective weight associated with the one or more subsets of historical transaction data based on a number of retrieved subsets of historical transaction data.

* * * * *